No. 712,735. Patented Nov. 4, 1902.
J. SIMONS & K. P. HANGL.
MACHINE FOR MOLDING ARTICLES FROM PLASTIC MATERIALS.
(Application filed Feb. 8, 1902.)
(No Model.) 3 Sheets—Sheet 1.
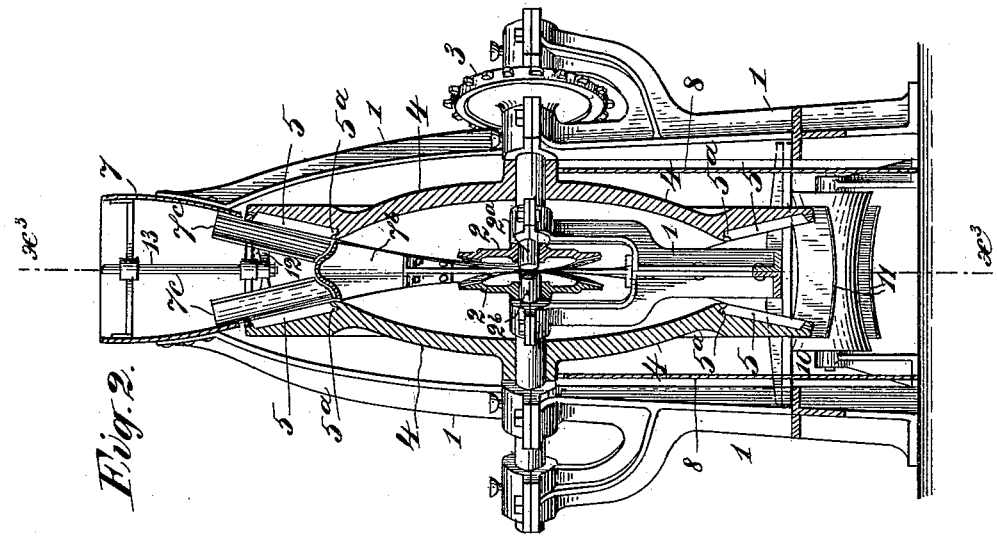
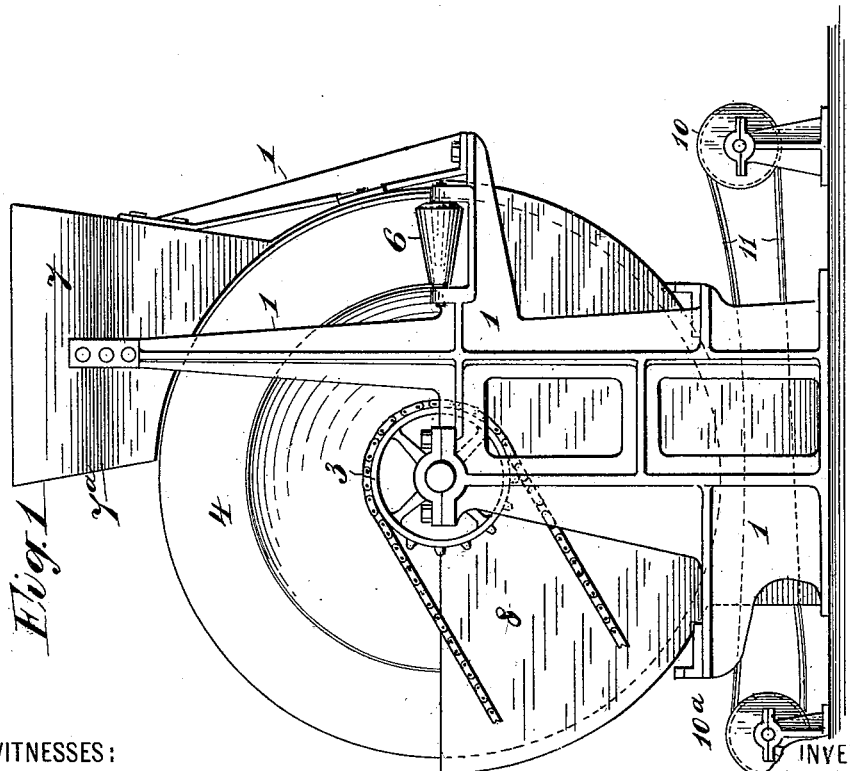
WITNESSES:
INVENTORS:
Joseph Simons
Karl P. Hangl
BY
ATTORNEY No. 712,735. Patented Nov. 4, 1902.
J. SIMONS & K. P. HANGL.
MACHINE FOR MOLDING ARTICLES FROM PLASTIC MATERIALS.
(Application filed Feb. 8, 1902.)
(No Model.) 3 Sheets—Sheet 2.
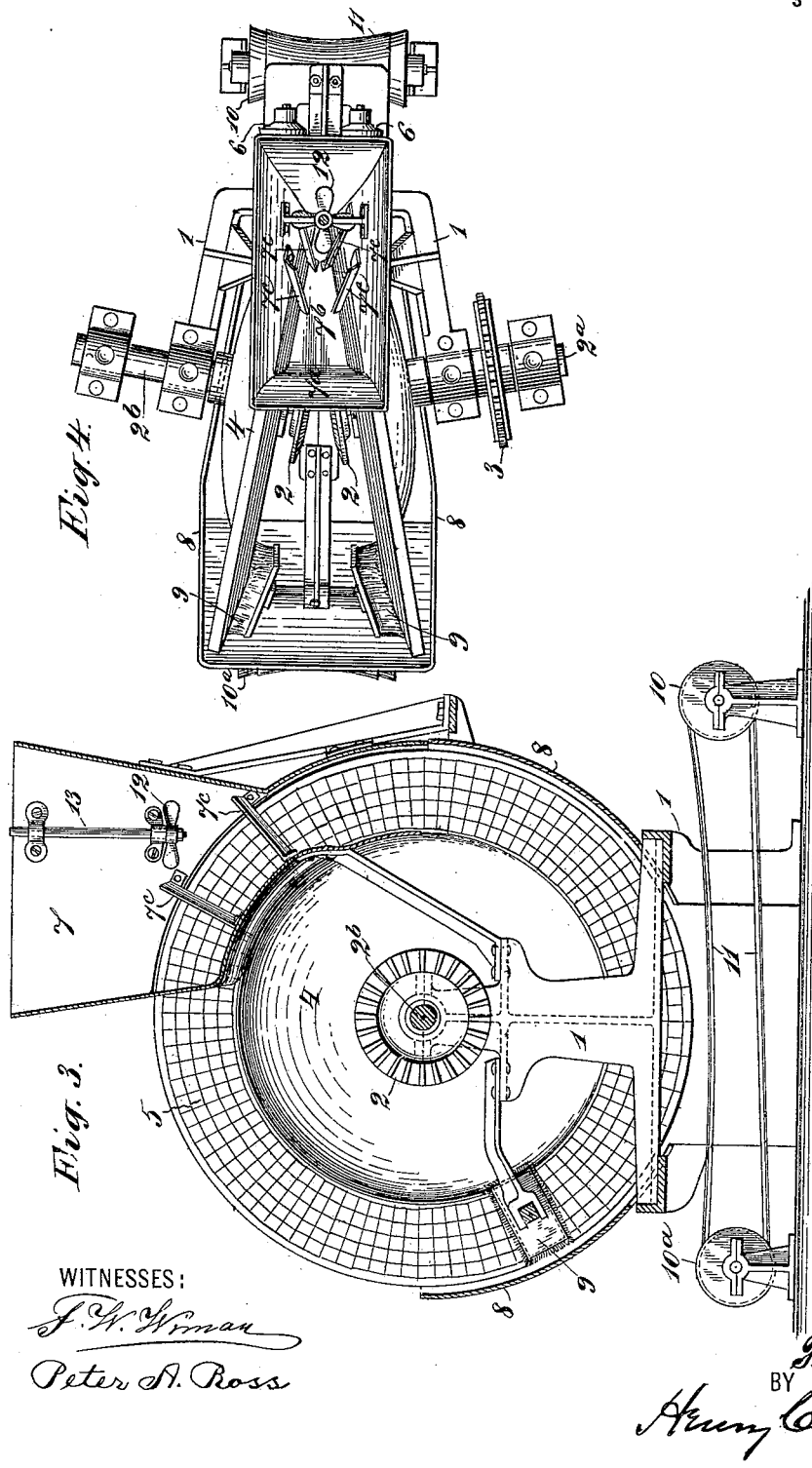

No. 712,735. Patented Nov. 4, 1902.
J. SIMONS & K. P. HANGL.
MACHINE FOR MOLDING ARTICLES FROM PLASTIC MATERIALS.
(Application filed Feb. 8, 1902.)
(No Model.) 3 Sheets—Sheet 3.
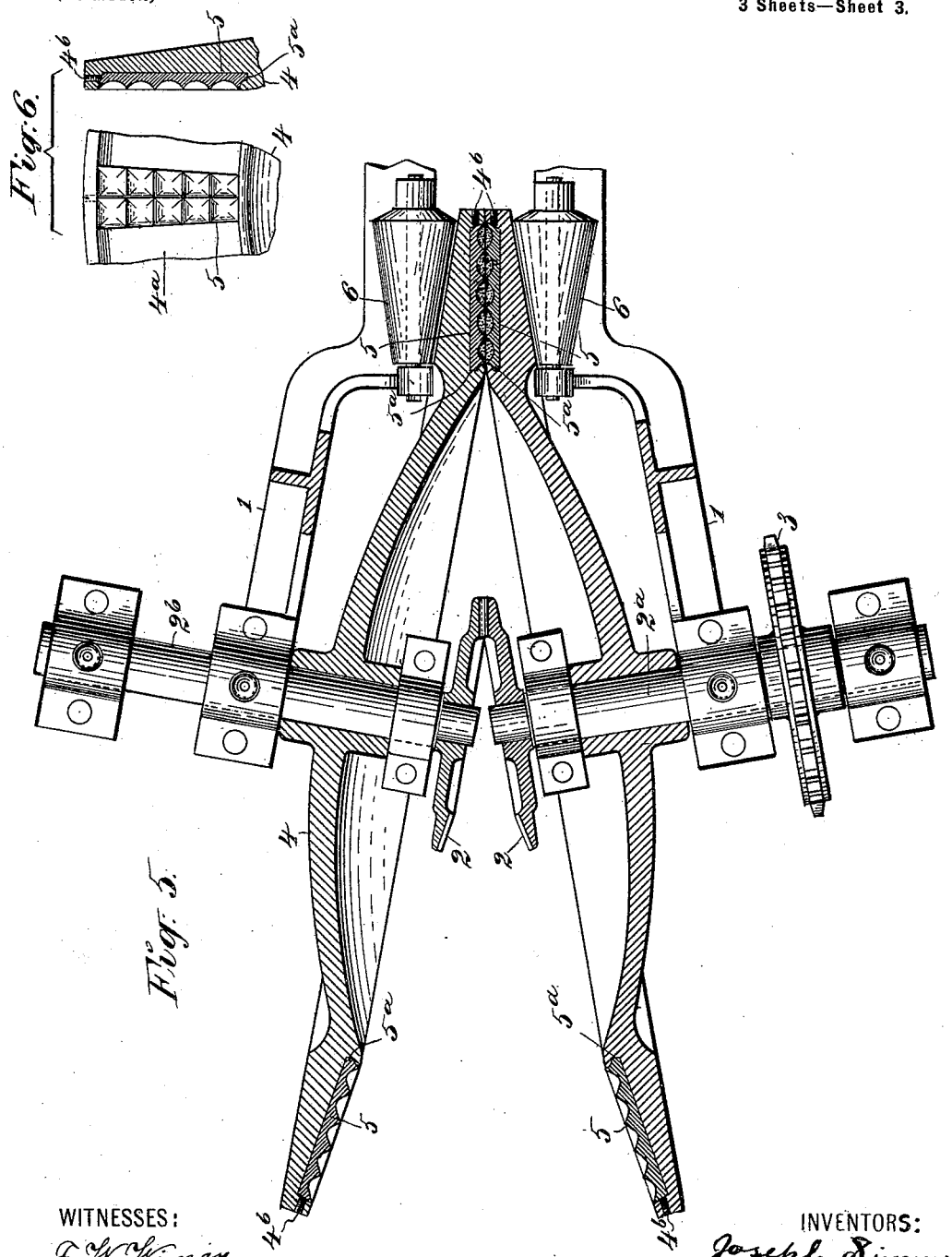
WITNESSES:
F. W. Wiman
Peter A. Ross
INVENTORS:
Joseph Simons
Karl P. Hangl
BY
Henry Connett
ATTORNEY

UNITED STATES PATENT OFFICE.

JOSEPH SIMONS AND KARL P. HANGL, OF NEW YORK, N. Y.

MACHINE FOR MOLDING ARTICLES FROM PLASTIC MATERIALS.

SPECIFICATION forming part of Letters Patent No. 712,735, dated November 4, 1902.

Application filed February 8, 1902. Serial No. 93,131. (No model.)

*To all whom it may concern:*

Be it known that we, JOSEPH SIMONS, a subject of the German Emperor, residing in the borough of Manhattan, and KARL P. HANGL, a citizen of the United States, residing in the borough of Bronx, in the city, county, and State of New York, have jointly invented certain new and useful Improvements in Machines for Molding Articles from Plastic Materials, of which the following is a specification.

This invention relates to the class of rotary peripheral molding-machines such as are adapted for molding fuel briquets and the like; and the object is to produce a simple and effective machine for the purpose which has important advantages due to its construction and to the arrangement of its parts.

The characteristic feature of the machine embodying this invention is that it employs two similar mold-wheels, which rotate in the same direction, these mold-wheels having beveled peripheries which carry the molds and which have peripheral and tangential contact at the molding-point. To bring the beveled peripheries of said wheels together tangentially, the planes in which the wheels rotate converge toward the molding-point, the included angle being bisected by a plane which is tangent to the beveled peripheries of the two wheels at the molding-point or where they are tangent to each other. The wheels are symmetrically disposed on either side of the said bisecting plane, which will be by preference a vertical plane, and preferably also the disposition of the wheels will be such that a plane passing through the line of peripheral contact of the two beveled faces thereof and through their centers will be a substantially horizontal plane. This construction permits the use of relatively small wheels or wheels of relatively small diameter, compactly arranged as to space, and yet provides the desirable gradual compression of the material, all as will be more fully explained with reference to the accompanying drawings, which serve to illustrate one embodiment of the invention.

In the drawings, Figure 1 is a side elevation of the machine; and Fig. 2 is a sectional elevation thereof, the wheels and hopper being in vertical section and the frame in elevation. Fig. 3 is a vertical mid-section in the plane indicated by line $x^3$ in Fig. 2, and Fig. 4 is a plan. Fig. 5 is an enlarged horizontal section of the mold-wheels, taken at the level of their axes. Fig. 6 shows a mold-block detached in face and edge view.

1 is a suitable bed plate and frame to support the operative mechanism, and on this bed-plate are rotatively mounted two shafts $2^a$ and $2^b$. The shaft $2^a$ is driven from any source of power and drives the shaft $2^b$ through the medium of bevel-gears 2. Obviously the shaft $2^a$ may be driven through any translating medium—as a sprocket-wheel 3, for example. These shafts are mounted with their axes at an angle, as clearly seen in Figs. 4 and 5, and on each is secured a mold-wheel 4. These wheels rotate in planes which converge, the angle of convergence being by preference about twenty degrees. Where the wheels come together, their beveled faces are supplied with molds, half of the full-mold recess being in the face of each wheel, and at the tangent point or line of the faces of the wheels the half-molds come together and register, forming full molds. Preferably the molds or mold-recesses will be formed in the faces of mold-blocks 5, set in an annular recess in the face of the mold-wheel and secured therein by a set-screw or other suitable means. Fig. 6 illustrates the preferred construction of the mold-block and the half-molds therein. As the face of the mold-wheel, measured radially along the line where the faces of the two wheels are tangent, will be considerable, there may be, and usually will be, a plurality of molds in each block along this line—say from five to eight—and there may be two rows of such molds in each block. The block (see Fig. 5) has at its inner end a tongue $5^a$, which engages a circumferential keeper-groove $4^a$ in the face of the mold-wheel, the outer end of the block being slightly beveled, so as to enter the recess in the wheel readily. A set-screw $4^b$ secures the block in place. This removability of the molds has the advantages that a block may be readily replaced if injured and blocks having mold-recesses of one dimension or size may be replaced conveniently with those of another size without delay or difficulty. In order to avoid the springing apart of the mold-wheels at the point where they come together and finally compress and form the briquets, the rims of the mold-wheels will be backed at this point by suitable bearing rollers or wheels 6, which roll on the outer faces of the wheel-rims.

The hopper 7, into which the material is fed in a continuous manner, is mounted on suitable supports above the mold-wheels. As seen in the several figures, but particularly in Fig. 3, the bottom delivery of this hopper extends from a point somewhat back of the centers of the mold-wheels down to the molding-point. At its sides this hopper or receptacle fits down close to the rims of the mold-wheels. for a little more than one-fourth of their circumference, and at the back, where the wheels are widest apart, the back $7^a$ of the hopper extends down between the mold-faces of the wheels and connects with the bottom $7^b$ of the mold. This latter is curved to conform and fit quite closely to the inner curve of the two mold-faces and is of a triangular form, as seen in plan, to fit the triangular space between the converging wheels. This bottom of the hopper is arched in cross-section, as seen in Figs. 2 and 3, the elevation being preferably greatest at the point where the bottom is widest, (where it joins the back $7^a$,) and this elevation gradually diminishes as it nears the point where the mold-faces of the wheels approach and finally come together. Preferably the hopper 7 will have in it deflectors $7^c$, mounted on the bottom $7^b$ and set obliquely to the mold-faces on the wheels. These deflectors fit up quite closely to the mold-faces and serve to deflect the material into the mold-cavities in the latter as the wheels rotate. The lower portions of the mold-wheels and the gearing should be inclosed in a suitable casing 8 to prevent the material which may fall from the mold-faces from getting into the gearing and bearings.

To clean the molds from adherent particles of the material being molded, suitable brushes 9 are employed. These are mounted on a fixed part and bear on the moving mold-faces of the wheels at some point between the place where the material is supplied from the hopper and the point where the molded briquets are delivered. These latter fall out below by gravity as the mold-faces separate below the molding-point, and here by preference is established an endless carrier to receive and deliver the briquets to any point desired. This carrier comprises drums 10 and $10^a$ and an endless belt 11. The carrier may be driven from any source of power.

In operating the machine the mold-wheels are set in motion rather slowly, and the material to be molded is fed or placed in the hopper 7. Preferably the material will be fed continuously and automatically to the hopper. As the mold-wheels rotate the deflectors $7^c$ deflect the mass to the converging molds and aid in filling them. The molds gradually close together and compress the material into compact briquets having the form of the mold, and as the molds gradually separate below these briquets fall out upon the endless carrier and are borne away. In order to impart a trough-like form to the flexible material of the endless belt of the carrier, the drums on which it runs may have slightly-concave peripheries.

Conveniently the molds or molding-recesses will be of rectangular contour, so that the walls that separate them may be brought to an edge; but they will be or may be concave interiorly. It is not important to this invention what shape or size is imparted to the molded article. This is a matter of judgment or taste and will be in some degree dependent on the purpose for which the molded articles are intended.

In the drawings we have shown how the mass of plastic material in the hopper 7 and just above the mold-wheels may be stirred or agitated to prevent the formation of an arch in the mass, such as will sometimes occur. As herein shown, the agitator is a paddle-wheel 12 on an upright shaft 13, mounted rotatively in bearings in the hopper. This shaft, like the endless carrier, may be driven from any source by well-known means, not necessary to describe. They may be driven from the shaft $2^b$, for example. Means may also be provided for automatically oiling the molds; but this we have not deemed it necessary to describe.

Obviously we do not wish to restrict our invention to the precise construction herein shown. We believe we are the first to have employed what may be called "like bevel-wheels" rotating in the same direction for molding articles from plastic materials, the molds being carried in the faces of these wheels, and we wish to claim this construction broadly.

We have shown the machine wtih each mold-wheel carrying a half-mold or mold-recess; but, if desired, one wheel might have a smooth face and the other mold-recesses. This would be an operative construction for some forms of briquets or blocks.

Having thus described our invention, we claim—

1. A machine for the purpose specified, having two bevel mold-wheels carrying molds at their beveled faces which are alike and in peripheral contact at the molding-point, and means for driving said wheels in unison, whereby corresponding points in the beveled meeting faces of the wheels will register at all times.

2. A machine for the purpose specified, having two beveled mold-wheels so disposed as to place their like beveled peripheries into tangential contact at the molding-point, and carrying molds at their beveled faces, means for rotating said wheels in unison, and means for keeping the beveled faces pressed together at the molding-point.

3. A machine for the purpose specified having two oblique mold-wheels carrying molds at their peripheries which come together face to face at the molding-point, and having pressure-rollers which bear on the mold-wheels so as to press them together at the molding-point.

4. A machine for the purpose specified having two oblique mold-wheels which come together face to face at the molding-point and rotate in the same direction, molds carried by the peripheral faces of said wheels, and a hopper above said wheels to supply the material to be molded, said hopper having a triangular bottom which fits between said mold-wheels and is elevated at its center.

5. A machine for the purpose specified having two oblique mold-wheels which rotate in the same direction and come together face to face at the molding-point, removable mold-blocks secured to the mold-faces of said wheels, said mold-blocks having the mold-recesses formed in their faces, a hopper to supply the material to be molded, and pressure-rollers to keep the molds from spreading at the molding-point.

6. A machine for the purpose specified having two oblique mold-wheels which rotate in the same direction and carry molds at their molding-faces which come together at the molding-point, a hopper to supply the material to be molded, and deflectors in said hopper to deflect the material laterally to the molds.

7. A machine for the purpose specified, comprising the two oblique mold-wheels, the hopper which supplies the material to be molded, an agitator in said hopper, means for brushing the molds, and means for carrying away the articles molded and discharged.

8. A machine for the purpose specified, having two like beveled mold-wheels carrying molds at the beveled faces, said wheels being so disposed as to put the said beveled faces in peripheral contact at a point in substantially the same horizontal plane with the centers of the wheels.

9. A machine for the purpose specified having two like beveled mold-wheels with recessed part molds in the beveled faces of both wheels, said wheels being disposed with said mold-bearing faces in peripheral contact, and means for driving said wheels in unison so as to maintain the register of the part molds.

In witness whereof we have hereunto signed our names, this 7th day of February, 1902, in the presence of two subscribing witnesses.

JOSEPH SIMONS.
KARL P. HANGL.

Witnesses:
PETER A. ROSS,
HENRY CONNETT.